United States Patent [19]

Masaki

[11] Patent Number: 5,652,607
[45] Date of Patent: Jul. 29, 1997

[54] RECORDING APPARATUS

[75] Inventor: Tomoaki Masaki, Yokohama, Japan

[73] Assignee: Canon Kabushiki Kaisha, Tokyo, Japan

[21] Appl. No.: 527,380

[22] Filed: Sep. 13, 1995

Related U.S. Application Data

[63] Continuation of Ser. No. 939,740, Sep. 2, 1992, abandoned

[30] Foreign Application Priority Data

Sep. 4, 1991 [JP] Japan .................................. 3-224216

[51] Int. Cl.$^6$ .................................................. G06K 15/00
[52] U.S. Cl. ................................ 347/5; 347/3; 358/439
[58] Field of Search ....................... 347/3, 5, 9; 358/437, 358/439

[56] References Cited

U.S. PATENT DOCUMENTS

| | | | |
|---|---|---|---|
| 4,001,839 | 1/1977 | Kraus | 346/140 |
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 395/114 |
| 4,723,129 | 2/1988 | Endo et al. | 347/56 |
| 4,740,796 | 4/1988 | Endo et al. | 347/56 |
| 4,958,298 | 9/1990 | Okamoto . | |
| 5,093,903 | 3/1992 | Sudoh et al. | 395/102 |
| 5,235,674 | 8/1993 | Cohen-Skalli et al. | 395/101 |

FOREIGN PATENT DOCUMENTS

| | | |
|---|---|---|
| 54-056847 | 5/1979 | Japan . |
| 59-1236670 | 7/1984 | Japan . |
| 59-138461 | 8/1984 | Japan . |
| 60-071260 | 4/1985 | Japan . |
| 2202662 | 9/1988 | United Kingdom . |

OTHER PUBLICATIONS

IBM Technical Disclosure Bulletin, "Printer Low Power Circuit", vol. 29 No. 10, pp. 4417–4418, Mar. 1987.

IBM Technical Disclosure Bulletin, "Operator–Selectable Environment of a Personal Computer Printer", vol. 31, No. 1, p. 236, Jun. 1988.

Primary Examiner—Benjamin R. Fuller
Assistant Examiner—Craig A. Hallacher
Attorney, Agent, or Firm—Fitzpatrick, Cella, Harper & Scinto

[57] ABSTRACT

Power is supplied to a CPU without regard to an on/off-state of a power switch. In the off-state, the CPU renders a control signal, which indicates that an apparatus does not accept data, to an active state or a high impedance state to inform to a host. When data is received, the state is switched to the on-state for recording operation. The received data is stored in a memory, and when the state is switched to the on-state, the data is read from the memory for recording operation. In this manner, loss of record data due to data transmission from the host in the off-state of the power switch is prevented.

28 Claims, 12 Drawing Sheets

RECORDING APPARATUS

This application is a continuation of application Ser. No. 07/939,740 filed Sep. 2, 1992, now abandoned.

BACKGROUND OF THE INVENTION

1. Field of the Invention

The present invention relates to a recording apparatus for recording an image in accordance with input data.

2. Related Background Art

In a prior art recording apparatus (hereinafter referred to as a printer), a power switch serves as a switch for a power supply circuit, and when the printer power supply is turned on, a power is supplied to a control circuit of a printer, and when the printer power supply is turned off, no power is supplied. However, this method includes the following drawbacks:

(1) When the power supply is turned on, it is necessary for a carriage to detect an absolute position (home position detection).

(2) Since it is not possible to prevent a recording head from adhering when the power supply is turned off, a recovery control of the recording head is required when the power supply is turned on.

(3) Since the recovery control of the head is required each time the power supply is turned on, an amount of ink used increases because of the repetitive turn-on/off of the power supply.

(4) If a power-off sequence such as paper ejection and capping of a head is to be carried out when the power supply is turned on, a special circuit to control the apparatus such that the supply of the power is not stopped until the termination of the power-off sequence is required.

In order to solve the above problems, it has been proposed to not use the turn-on/off of the printer by the power switch to turn on and off the power supply circuit but use it to set a print enable state and a print disable state.

However, when the turn-on/off of the printer power supply is used to set the print enable state and the print disable state instead of using it for turning on and off the power supply circuit, there is a possibility that a host computer may send print data in accordance with an interface signal of the printer because the interface signal is valid even during the off-state of the printer power supply.

Thus, in the prior art printer in which the on/off-state of the printer power supply corresponds to the on/off-state of the power supply circuit, the interface signal to the printer is at a low level or in a high impedance state when the printer power supply is turned off. Among others, a signal line which indicates that the printer does not accept data such as a busy signal (data is not acceptable when it is active) which indicates whether the printer can accept the data or not and which is sent from the printer to the host, an error signal which indicates an off-line state or any trouble or a PE signal which indicates that papers have been exhausted, is at the high impedance state, and the signal line is at the high level if it is pulled up by the host, and at the low level if it is pulled down.

Thus, when the printer power supply is turned off, the host pulls up or down the signal line to render the busy signal, the error signal or the PE signal active in order to prevent the data from being sent to the printer.

However, when the on/off-state of the printer power supply is used to control the print enable state and the print disable state instead of using it to turn on/off the power supply circuit, the busy signal, the error signal and the PE signal are not in the high impedance state even when the printing operation is not carried out because the power is supplied to the control circuit of the printer, and hence there is a possibility that the print data may be sent from the host.

SUMMARY OF THE INVENTION

In the light of the above, it is an object of the present invention to provide an improved recording apparatus.

It is another object of the present invention to provide a recorder which can positively prevent mistransmission of record data.

It is still another object of the present invention to provide a recording apparatus in which power is supplied to control means without regard to on/off-state of power switch means and in which a control signal indicating that the recording apparatus does not accept data is rendered active or in a high impedance state when the power switch is turned off.

It is still another object of the present invention to provide a recording apparatus which turns on the apparatus to record data if the data is sent from a host in the off-state of the power switch means.

It is a further object of the present invention to provide a recording apparatus which stores data in memory means if data is sent from the host in the off-state of the power switch means and records the stored data after the recording apparatus has been turned on.

The above and other objects of the present invention will be apparent from the following detailed description and the accompanying drawings.

DETAILED DESCRIPTION OF THE PREFERRED EMBODIMENTS

The embodiments of the present invention are now described in detail with reference to the drawings.

Figure 1:
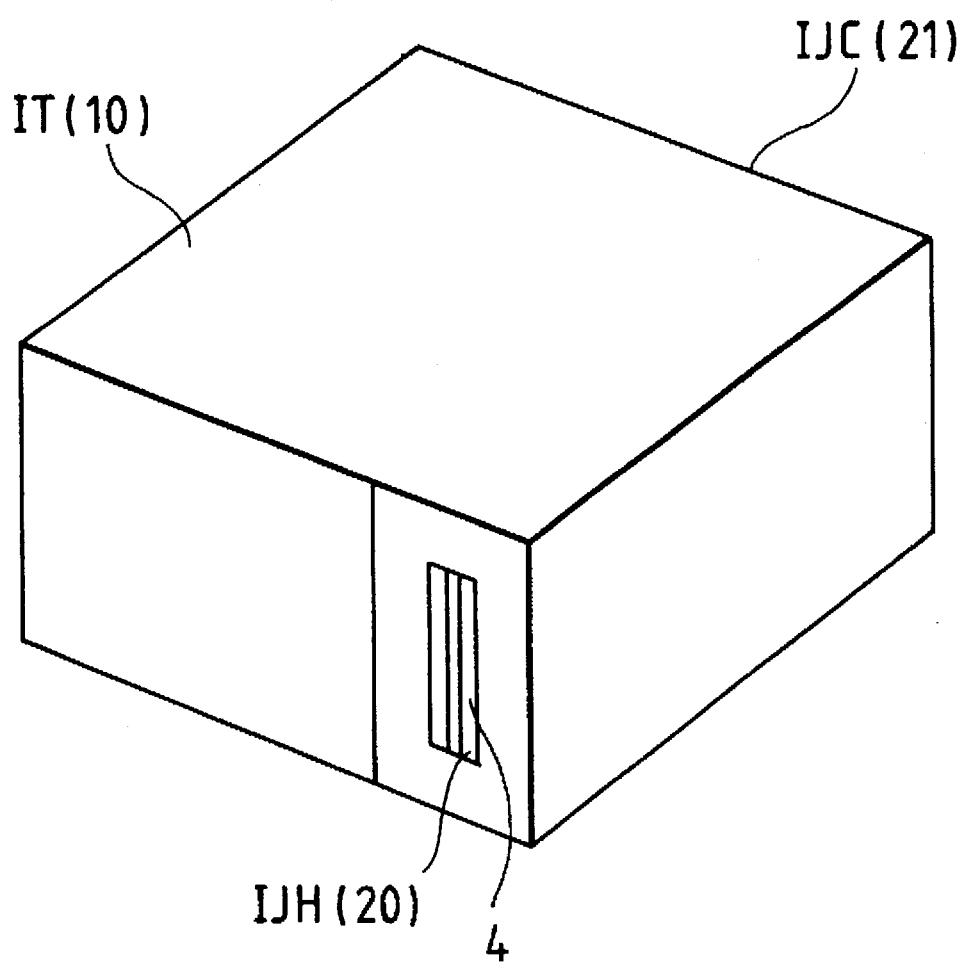
FIG. 1 shows a record head of an ink jet recording apparatus to which the present invention is applicable.
Figure 2:
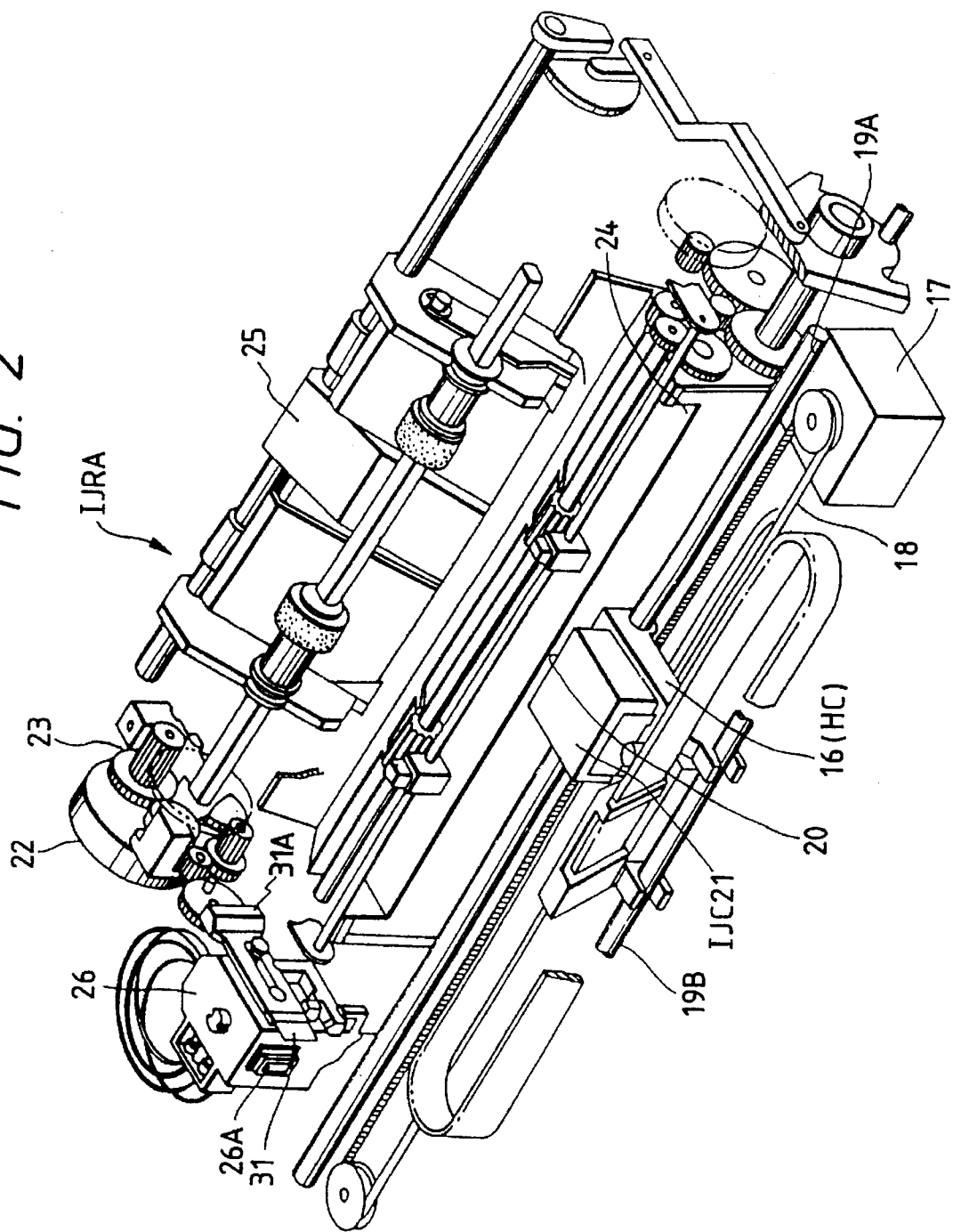
FIG. 2 shows a perspective view of the ink jet recording apparatus to which the present invention is applicable.

FIGS. 1 and 2 show a construction of a printer to which the present invention is applicable. IJH (20) denotes an ink jet head (record head) which discharges ink to a record sheet by bubbles generated by thermal energy, IJC (21) denotes a removable ink jet cartridge having a tank IT which is integral with the ink jet head IJH (20) to supply ink thereto.

As seen from a perspective view of FIG. 1, in the ink jet cartridge IJC of the present embodiment, an end of the ink jet head IJH slightly projects from a front face of the ink tank IT. The ink jet head cartridge IJC is secured to a carriage HC mounted on an ink jet recording apparatus main body IJRA to be described later and it is disposable and removable from the carriage HC.

The first ink tank IT (10) which stores the ink to be supplied to the ink jet head IJH comprises an ink absorber, a vessel into which the ink absorber is to be inserted and a lid to seal the vessel (all not shown). The ink is filled in the ink tank IT (10) and the ink is supplied to the ink jet head as the ink is discharged.

In the present embodiment, a ceiling plate 4 is made of polysulfon, polyether suflon, polyphnylen oxide or polypropylene resin which is highly resistive to the ink.

The ink jet cartridge IJC thus constructed is removably mounted on a carriage HC of the ink jet recording apparatus IJRA to be described later in a predetermined manner so that a desired image is recorded on a record sheet by relative movement between the carriage HC and the record sheet in accordance with an input record signal.

FIG. 2 shows a perspective external view of an ink jet recording apparatus which is provided with the mechanisms described above.

Numeral 20 denotes an ink jet head (record head) of an ink jet head cartridge IJC having nozzles which discharge ink to a record plane of the record sheet fed onto a platen 24 by feed means which is driven by a paper feed motor to be described later. Numeral 16 denotes a carriage HC for holding the record head 20. It is linked to a portion of a drive belt 18 which transmits a drive force of a carriage motor 17 and slidable to two parallelly arranged guide shafts 19A and 19B so that the record head 20 can be reciprocally moved over the entire width of the record sheet. When one line of data has been recorded by the record head 20, the record sheet is fed by a predetermined amount so that data of the next line is recorded.

Numeral 26 denotes a head recovery device which is arranged at one end of the drive path of the record head 20, for example, at a position facing a home position. The head recovery device 26 is activated by a drive force of a recovery motor 22 through a transmission mechanism 23 to cap the record head 20. In association with the capping of the record head 20 by a cap 26A of the head recovery device 26, the ink is sucked (suction recovery) by appropriate suction means (for example, a suction pump) provided in the head recovery device 26 to forcibly discharge the ink from discharge ports (idle discharge) so that high viscosity ink in the discharge ports is removed to recover the discharging. Further, the record head is protected by the capping when the recording operation is over. The discharge recovery process is carried out when the power supply is turned on, the record head is replaced or the recording operation has not been carried out for more than a predetermined period.

Numeral 31 denotes a blade arranged on a side of the head recovery device to serve as a wiping member, which is made of silicone rubber. The blade 31 is held by a blade holding member 31A in a cantilever manner and it is activated by the motor 22 and the transmission mechanism 23 like the head recovery device 26 to engage with the discharge plane of the record head 20. At an appropriate timing in the recording operation of the record head 20 or after the discharge recovery by the head recovery device 26, the blade 31 is protruded into the drive path of the record head 20 to wipe off dew-drops, moisture or dusts on the discharge plane of the head 20 as the head 20 moves.

Figure 3:
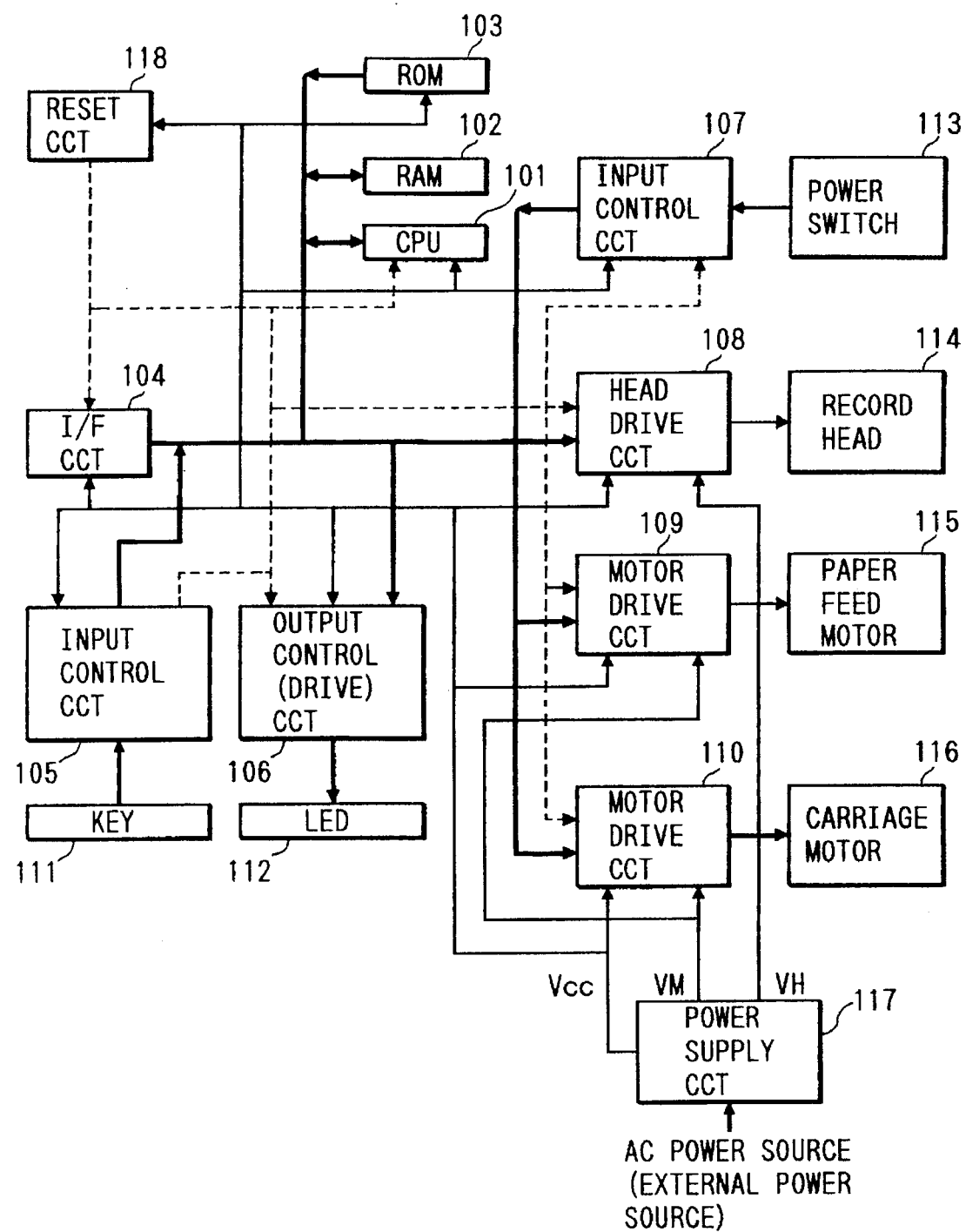
FIG. 3 shows a block diagram of a control unit of the ink jet recording apparatus.

FIG. 3 shows a control block diagram of the printer shown in FIG. 2. A CPU 101 controls a paper feed motor 115, a carriage motor 116 (corresponding to 17 in FIG. 2) and a record head (corresponding to 20 in FIG. 2) through motor drivers 109 and 110 and a head driver 108 in accordance with a program in a ROM 103 to print out record data, which is received from a host computer through an I/F circuit 104 and temporarily stored in a receive buffer in a RAM 102 and then read by the CPU 101 for bit development or various print controls. Input information from a keyboard 111 is also supplied to the CPU 101 through an input control circuit 105 to control the recording operation and change display of an LED 112 through an output control circuit 106. The present printer has a separate power switch 113 and a state of the power switch 113 is informed to the CPU 101 through the input control circuit 107.

Power is always supplied to a power supply circuit 117 of the present printer from an external power supply to produce various voltages $V_{CC}$ (to operate logic circuits), $V_M$ (to drive the motor) and $V_H$ (to drive the head) required to control, the printer.

The control circuit includes a reset circuit 118. When the printer is newly connected to the external power supply or the supply of the power from the external power supply is resumed after interruption, the power is supplied to the printer and the system is reset to initialize the CPU 101 and the control circuits.

Figure 4:
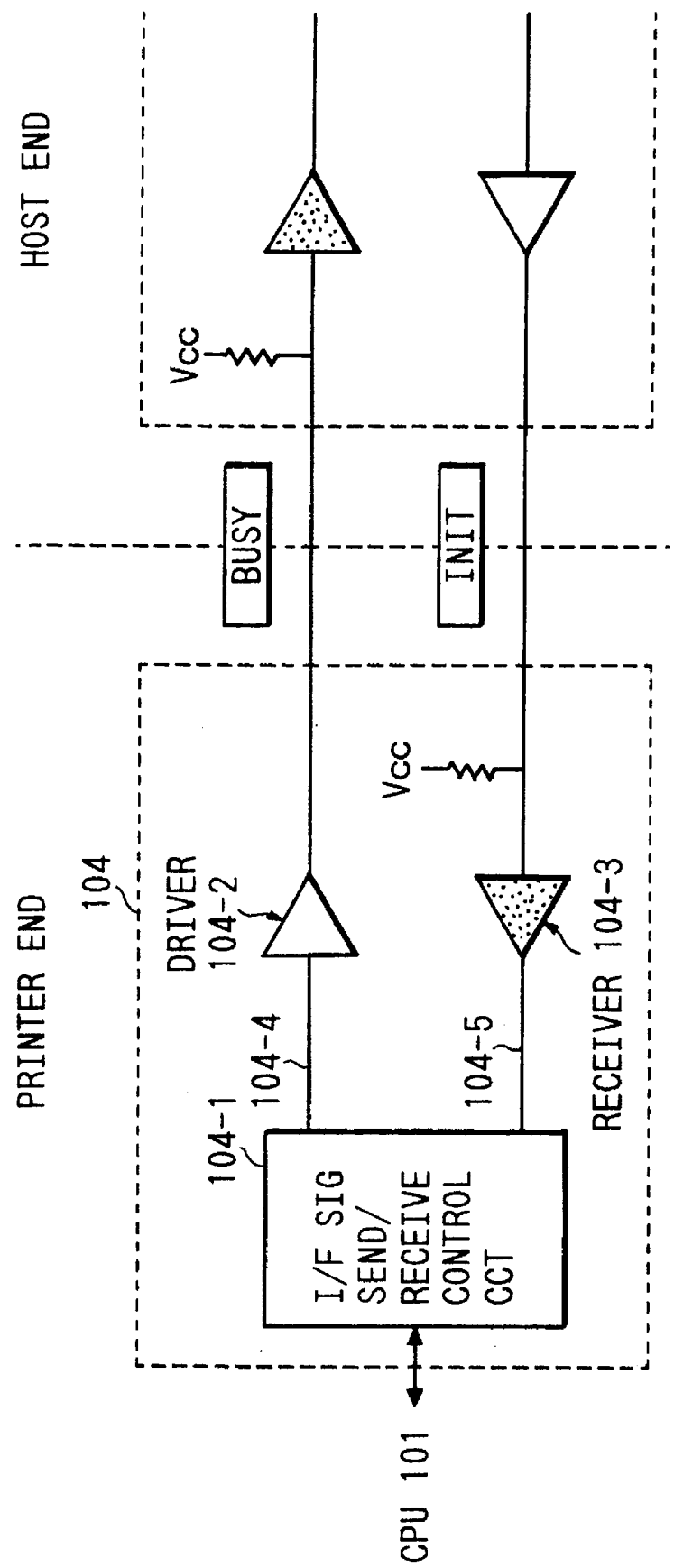
FIG. 4 shows a block diagram of an I/F circuit.

FIG. 4 shows a detail of the I/F circuit 104. Numeral 104-1 denotes an I/F signal send/receive control circuit which outputs a signal for rendering a signal line 104-4 to a high level or a low level in accordance with data from the CPU 101, to a driver 104-2 and sends data to the CPU 101 in accordance with a signal applied to a receiver 104-3 from the host through a signal line 104-5.

A voltage $V_{CC}$ is supplied to the I/F circuit 104 from the power supply circuit 117. When the supply of the voltage $V_{CC}$ is stopped, an output of the driver 104-2 assumes a high impedance state. In the present embodiment, the supply of the voltages $V_{CC}$, $V_M$ and $V_H$ to the respective loads from the power supply circuit 117 is not turned off even if the power switch 113 is turned off.

In the present embodiment, when the power switch 113 is turned off, at least one of the signals (busy signal, error signal and PE signal) which indicate that the printer does not accept data is rendered active to prevent the transmission of the data from the host computer.

Figure 5:
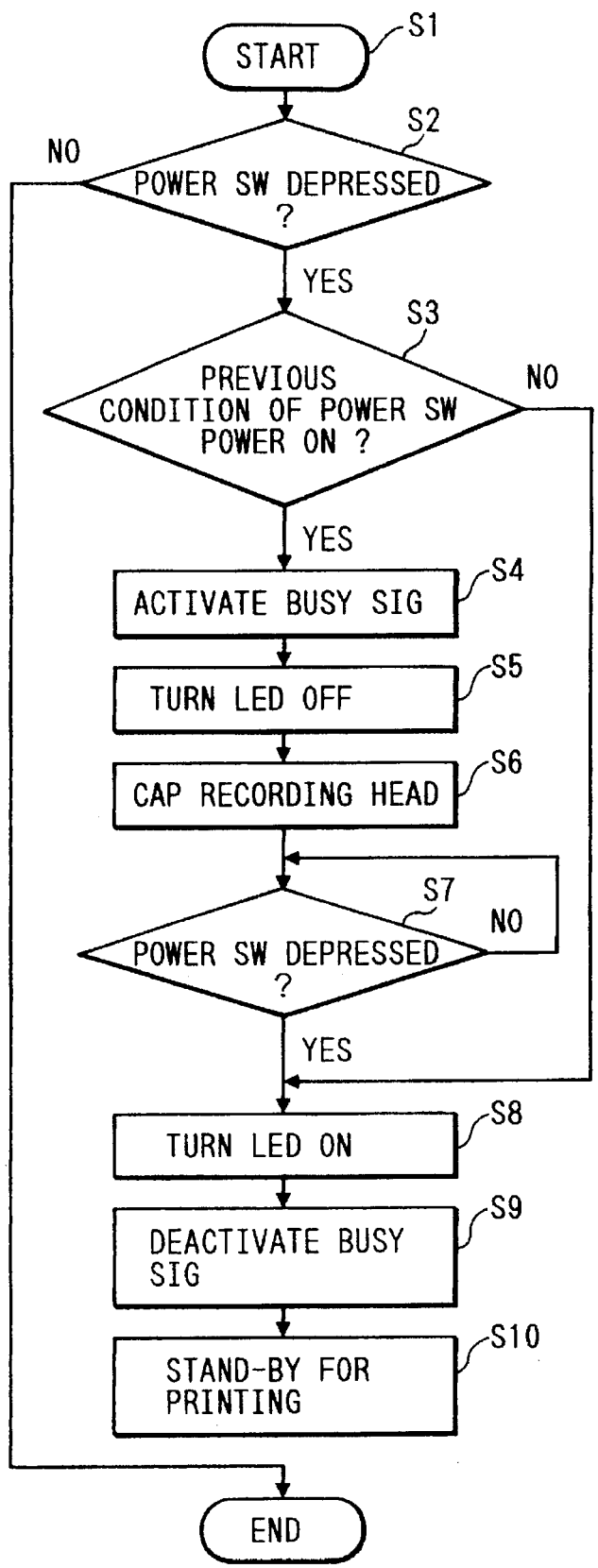
FIG. 5 shows a flow chart of a control in a first embodiment of the present invention.

The control of the printer is now explained with reference to FIG. 5. In a step S1, a power switch detection sequence is started. In a step S2, whether the power switch has been depressed or not is checked. The power switch 113 may be an on-off type switch, but in the present embodiment, a control circuit is used such that the power is turned on when the power switch 113 is depressed in the power-off state, and the power is turned off when the power switch 113 is depressed in the power-on state. If the depression of the power switch 113 is detected in the step S2, a state prior to the depression of the power switch 113 is determined in a step S3. If the state prior to the depression of the power switch 113 is the power-on state, it means that a user requests the power-off and the process proceeds to a step S4 to render the busy signal active so that the I/F signal is not accepted.

While the busy signal is explained in the present embodiment, a similar control may be made to at least one of the signals which indicate to the host that the printer does not accept the data, such as busy signal, error signal and PE signal.

After the step S4, the process proceeds to a step S5 where the display of the LED is extinguished to inform the power-off state to the user. In a step S6, in order to prevent the adherence of the ink to the record head, the record head 20 is moved to a capping position and it is capped by the cap 26A. While not shown in the flow chart, a series of operations commonly called a power-off sequence (ejection of paper, etc.) is also carried out separately from the capping. In a step S7, the depression of the power switch 113 is monitored. If the previous state is the power-off state in the step S3 or the power switch 113 is depressed in the step S7, it means that the user requests the power-on and the LED is turned on in a step S8 to indicate the power-on state. In a step S9, the busy signal of the I/F signals (which was activated at the time of the power-off) is deactivated.

Where dip switches for setting modes are provided, the information thereof is read and the transmission of the print data from the host is monitored (step S10).

While the existing I/F signal is used for control in the present embodiment, a similar control may be made for a specific printer by separately preparing a signal indicating the on/off-status of the printer power supply.

[Second Embodiment]

A second embodiment of the present invention is now explained with reference to the drawings. In the first embodiment, the particular signal (busy signal) is rendered active when the power supply is turned off to indicate to the host computer that the printer does not accept the data, as shown in FIG. 5. In the second embodiment, the particular signal (busy signal in the present embodiment) is rendered high impedance (or open) to assume the same state as that of no supply of the power to the printer so that the host computer detects that the printer power supply is turned off.

Figure 6:
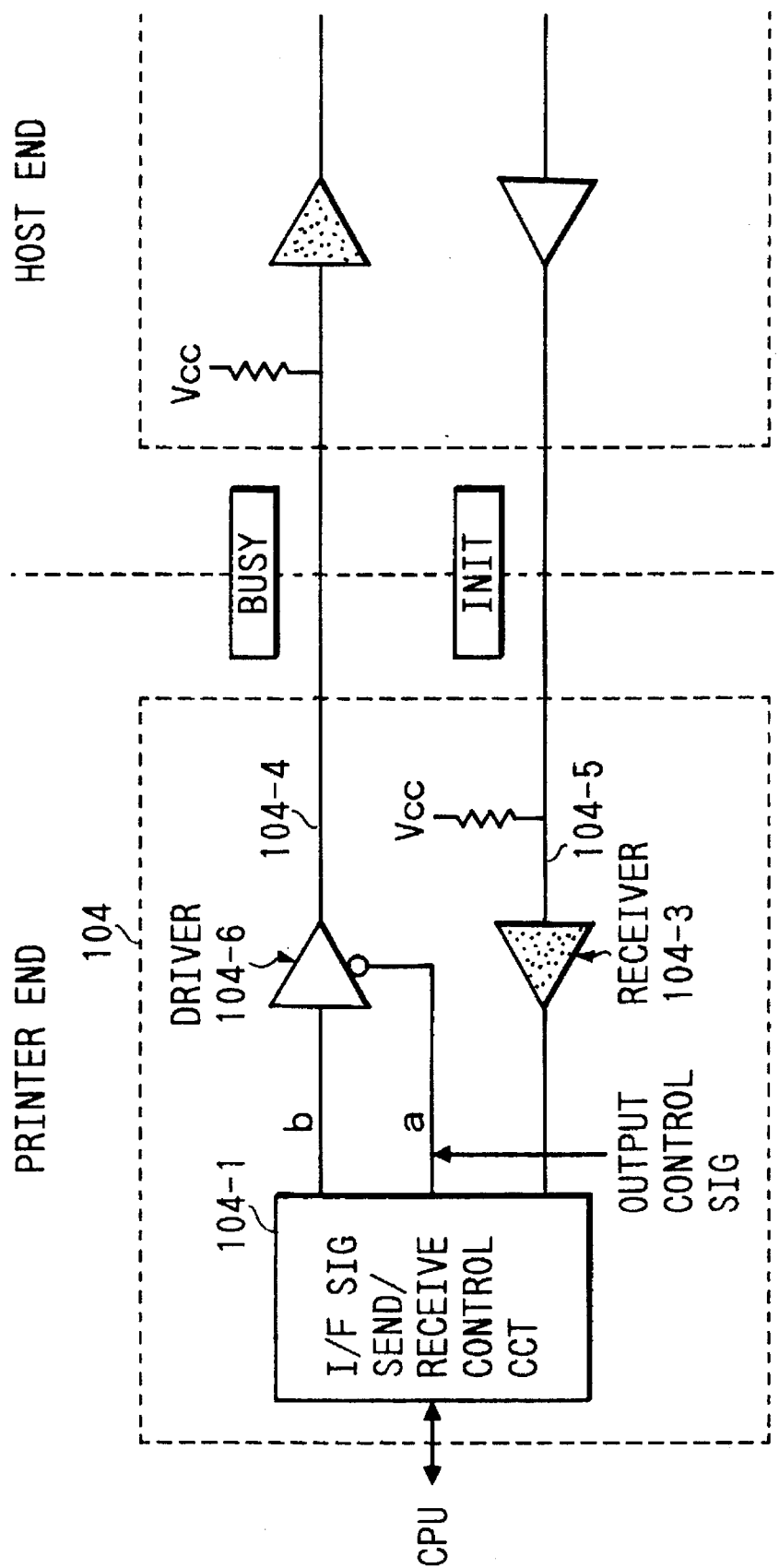
FIG. 6 shows a block diagram of an I/F circuit in a second embodiment of the present invention.

FIG. 6 shows a block diagram of a configuration of the I/F circuit 104 in the present embodiment. The like elements to those of FIG. 4 are designated by the like numerals, and numeral 104-6 denotes a driver with an output control function to render the busy signal to the high impedance state. When a control signal a is at a low level, an internal signal b is valid, and when the signal a is at a high level, the busy signal line is at the high impedance state.

Figure 7:
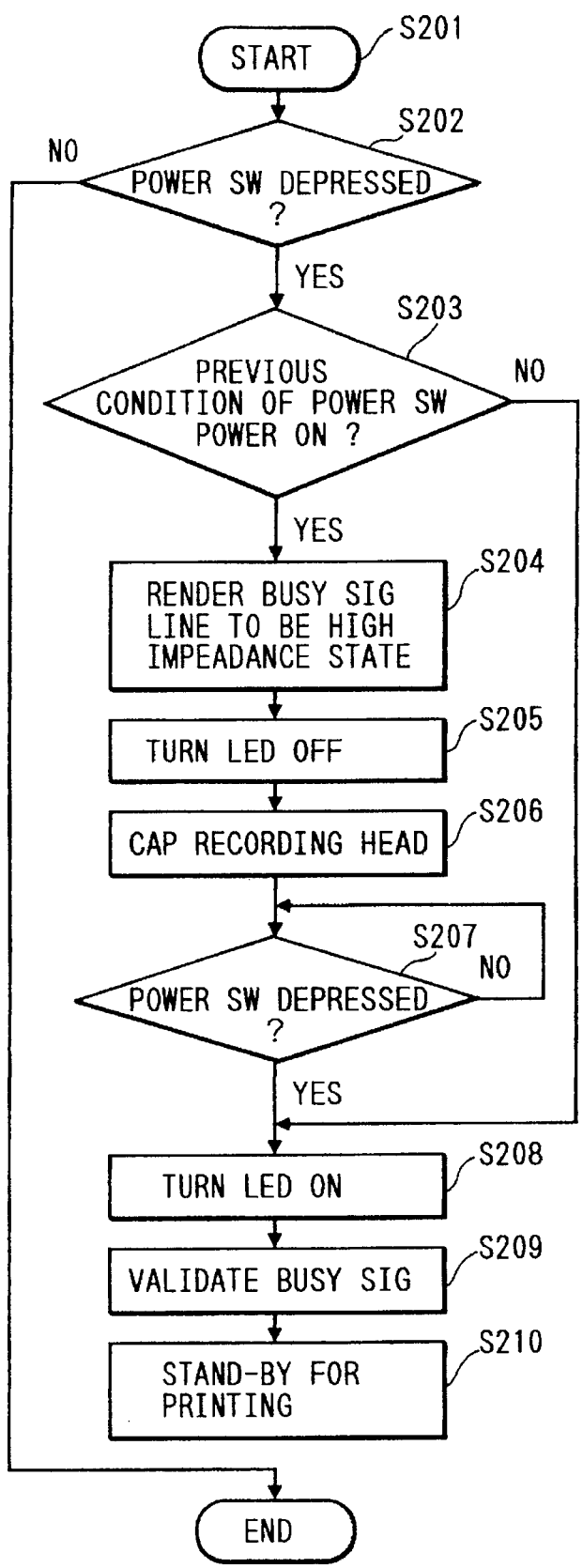
FIG. 7 shows a flow chart of a control in the second embodiment of the present invention.

FIG. 7 shows a flow chart of the control in the present embodiment. Steps S201–S203, S205–S208 and S210 are similar to the steps S1–S3, S5–S8 and S10 of FIG. 5, and the explanation thereof is omitted. When the power switch 113 is depressed, the process proceeds to a step S204 if the previous state is the power-on state to render the control signal a to the high level and the busy signal line to the high impedance state. The process then proceeds to a step S205.

If the previous state when the power switch 113 is depressed is the power-off state, the process proceeds to a step S209 through a step S208 to render the control signal a to the low level to validate (deactivate) the busy signal. Then, the process proceeds to a step S210.

[Third Embodiment]

A third embodiment of the present invention is now explained with reference to the drawings.

Figure 8:
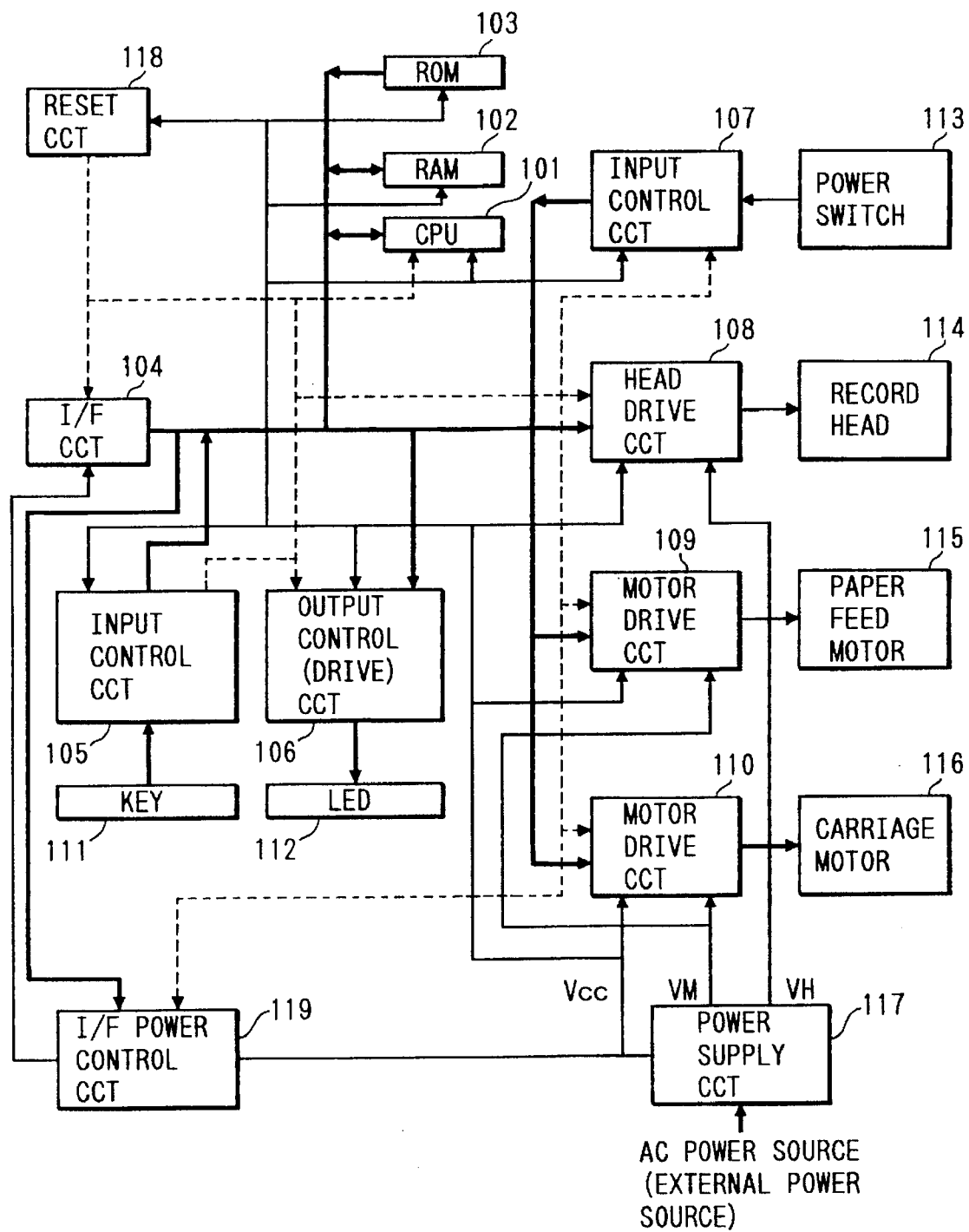
FIG. 8 shows a block diagram of a control unit of the ink jet recording apparatus in a third embodiment of the present invention.

FIG. 8 shows a control block diagram of the third embodiment of the printer of the present invention. The like elements to those of FIG. 3 are designated by the like numerals. Numeral 119 denotes an I/F power control circuit for controlling the supply of power to the I/F circuit 104. In the present embodiment, the power supply for the I/F circuit 104 is separated from the power supply for other control circuit, and the I/F power control circuit 119 turns off the power supply for the I/F circuit 104 (stops the supply of power) when the printer power supply is turned off by the power switch 113 and controls the supply of power to the I/F circuit 104 by a command from the CPU 101. The I/F circuit 104 in the present embodiment is configured as shown in FIG. 4.

Figure 9:
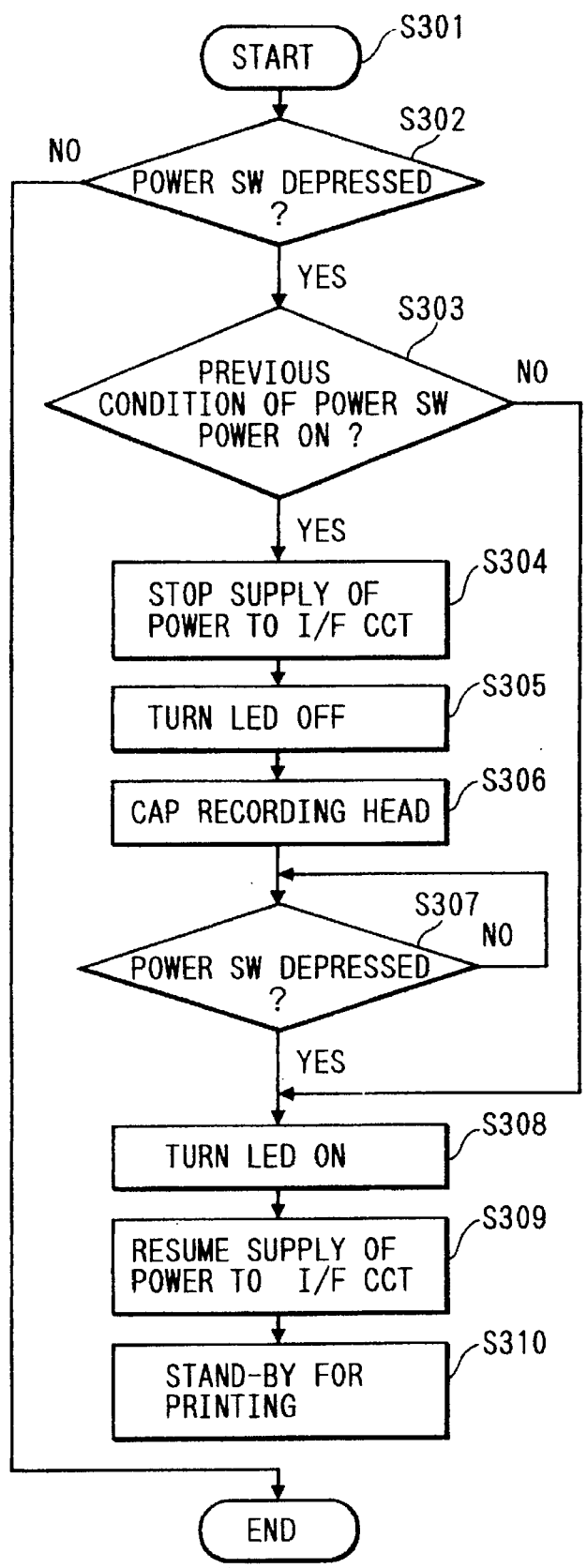
FIG. 9 shows a flow chart of a control in the third embodiment of the present invention.

A flow of control in the present embodiment is now explained with reference to a flow chart of FIG. 9. If the previous state when the power switch 113 is depressed is the power-on state, the supply of power to the I/F circuit 104 is stopped. Thus, the busy signal line 104-4 assumes the high impedance state. The LED is extinguished and the power-off sequence is executed. Then, the depression of the power switch 113 is monitored (steps S302–S307).

If the previous state when the power switch 113 is depressed is the power-off state, the supply of power to the I/F circuit 104 is resumed to be ready for receiving the print signal (steps S308–S310).

In the present embodiment, when the printer is turned off by the power switch 113, the supply of power to the I/F circuit 104 is blocked and the busy signal line is rendered to the high impedance state to prevent data from being transmitted from the host.

[Fourth Embodiment]

A fourth embodiment of the present invention is now explained. In the first, second and third embodiments, the particular control signal is controlled such that the data is not sent from the host when the printer power supply is turned off. In the present embodiment, the data from the host computer is received even in the off-state of the printer power supply.

Figure 10:
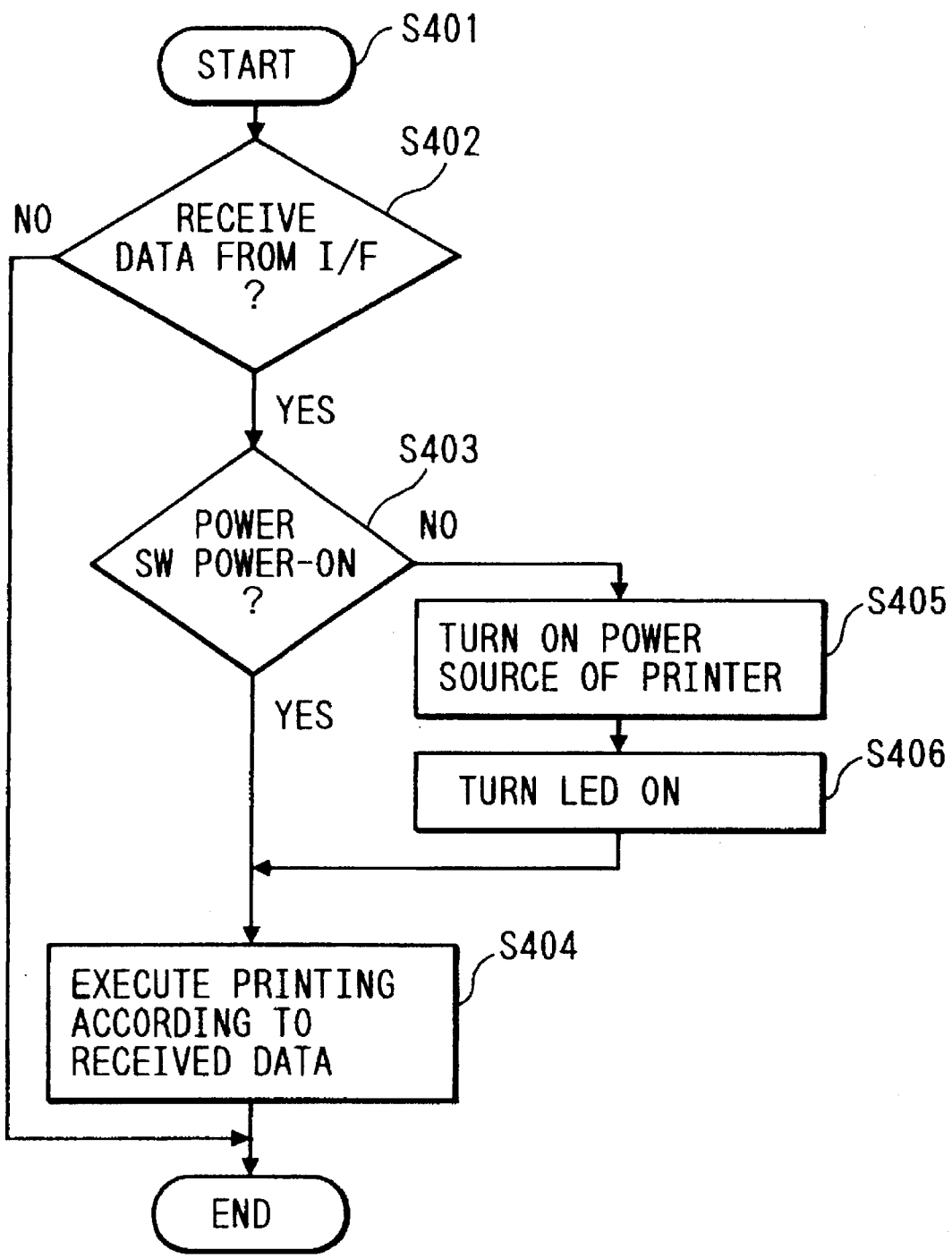
FIG. 10 shows a flow chart of a control in a fourth embodiment of the present invention.

A flow of control in the present embodiment is now explained with reference to a flow chart of FIG. 10. In a step S402, data from the I/F circuit 104 is received. In a step S403, the state of the power switch 113 is checked to determine whether the printer power supply is in the on-state or not. If it is in the on-state, the printing of the received data is started. If the printer power supply is in the off-state, the printer power supply is turned on in a step S405 and the LED is turned on in a step S406 (power-on sequence). Then, the printing of the received data is started (step S404).

Figure 11:
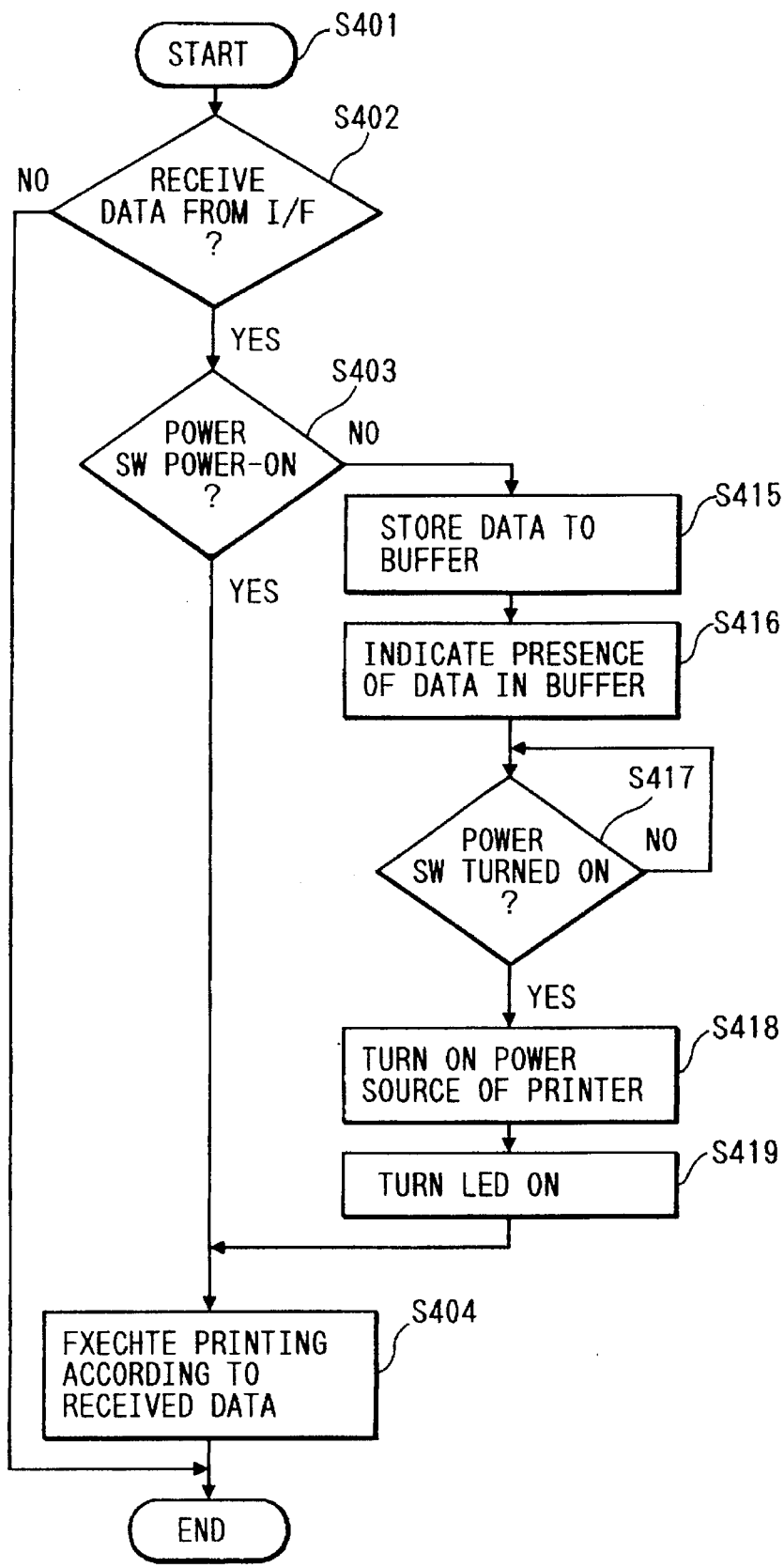
FIG. 11 shows a flow chart of a control in a modification of the fourth embodiment of the present invention.

In the present embodiment, the printer power supply is turned on immediately after the reception of the data from the host to start the printing, but the sheet may not have been correctly set because the printer power supply has been turned off. Accordingly, as shown in FIG. 11, the data from the host may be received as much the receive buffer of the printer may permit (step S415), the storage of the data in the receive buffer may be informed to the user by the LED (step S416), the printer power supply may be turned on when the user depresses the power switch 113 or other designated switch, and the printing may be started after the predetermined power-on sequence.

Figure 12:
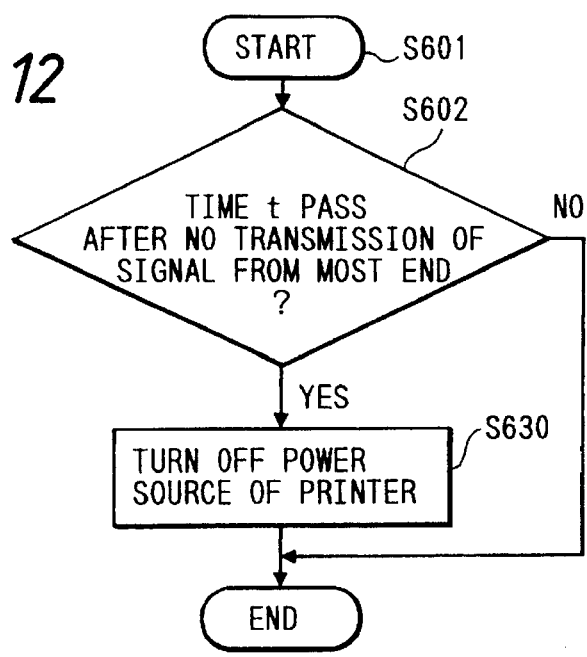
FIG. 12 shows a flow chart of a control when a power supply is automatically turned off.

In the present embodiment, the power supply may be automatically turned off when data is not received from the I/F circuit 104 for more than time t (for example, 30 minutes) to reduce power consumption, as shown in FIG. 12.

Namely, a time period during which no signal is sent from the host is counted by a timer set in a timer area of the RAM 102. Whether the time t (30 minutes in the present embodiment) has elapsed or not is determined (step S602), and if it has, the printer power supply is turned off (step S603).

[Fifth Embodiment]

A fifth embodiment of the present invention is now explained with reference to the drawings.

In the present embodiment, the printing is controlled by a request from the host, as it is in the fourth embodiment.

A control block diagram of the present embodiment is similar to that of FIG. 3. Like in the first and second embodiments of the present invention, the data from the host is normally not received when the printer power supply is in the off-state.

When an imprime or initial signal line Init from the host which commands the initialization to the printer is rendered active, the printer power supply is automatically turned on so that the printer is ready to receive the print data.

Figure 13:
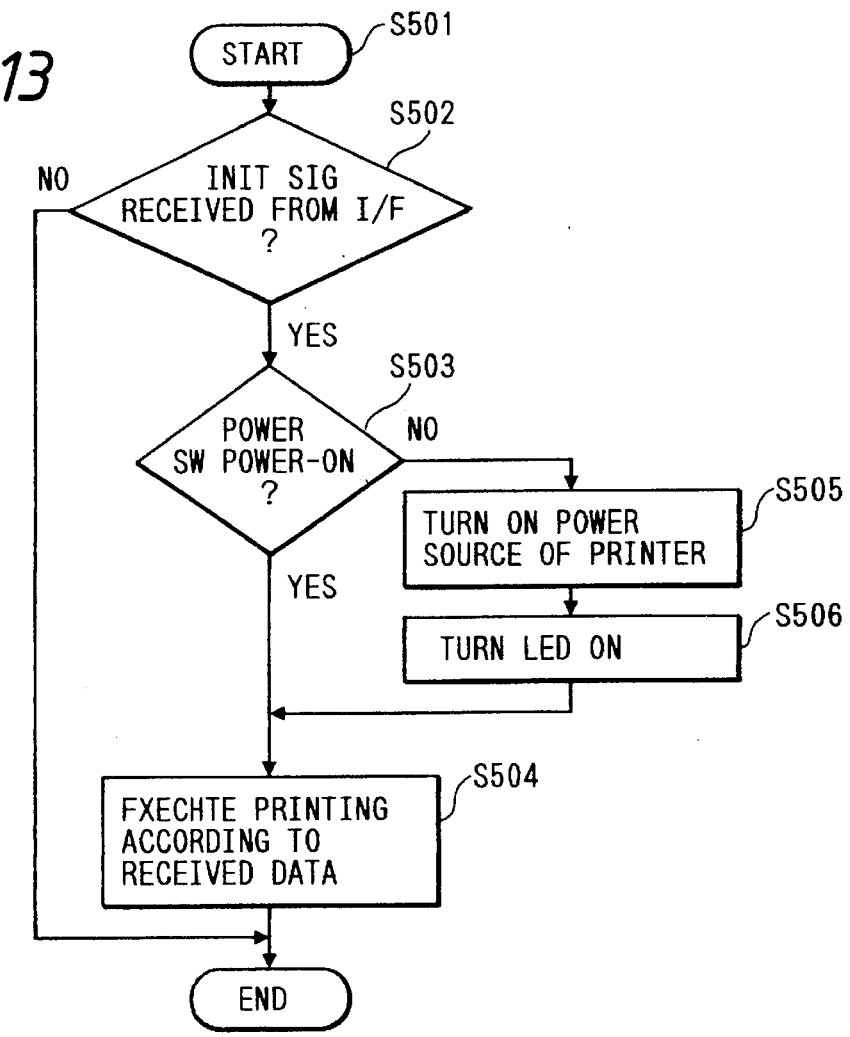
FIG. 13 shows a flow chart of a control in a fifth embodiment of the present invention.

FIG. 13 shows a flow chart of a control in the present embodiment. In a step S502, whether the signal Init has been received from the host or not is checked. If it has, the state of the power switch 113 is determined in a step S503. If it is the power-on state, the process proceeds to a step S504 to print out the received data.

If the state of the power switch 113 is the power-off state in the step S503, the process proceeds to a step S505 where the printer power supply is turned on. In a step S506, the LED is turned on to indicate the power-on state. Then, the process proceeds to a step S504.

In the present embodiment, the control is done by the signal Init from the host. When the printer is to be controlled by other signal line controlled by the host, that signal may be received to turn on the printer power supply and the printer may follow the control by the host.

In the above embodiments, the image is recorded by the ink jet recording method although other recording methods such as thermal recording by thermal papers and thermal transfer recording by ink sheets may be used.

In the above embodiments, the image is recorded by discharging ink droplets by the thermal energy generated by the thermal energy generation means such as electro-thermal transducer means as in the ink jet recording method although other recording methods such as a method of using pressure energy generation means such as an electro-mechanical transducer using a piezo-electric element and a method of using electromagnetic energy generation means for generating flying droplets by irradiating an electromagnetic wave such as laser to the ink, may be used. Of those, the method of using the thermal energy generation means such as an electro-thermal transducer permits high density arrangement of the discharge ports and the compaction of the record head.

Typical construction and principle thereof are disclosed in U.S. Pat. Nos. 4,723,129 and 4,740,796. This method is applicable to either an on-demand type or a continuous type. In the on-demand type, thermal energy is generated in the electro-thermal transducer by applying at least one drive signal which imparts rapid temperature rise exceeding nucleate boiling to the electro-thermal transducer arranged in association with sheets which hold the ink or an ink path to cause the nucleate boiling in a thermal action plane of the record head so that bubbles are formed in the ink in exact association with the drive signal. The ink is discharged from the discharge ports by the growth and contraction of the bubbles to form at least one droplet. When a pulsive drive signal is used, the growth and contraction of the bubbles are instantly and timely conducted so that the highly responsive discharge of ink is attained.

The pulsive drive signal may be that disclosed in U.S. Pat. Nos. 4,463,359 or 4,345,262. More excellent recording may be attained when the condition disclosed in U.S. Pat. No. 4,313,124 relating to a temperature rise rate on a thermal action plane is adopted.

The construction of the record head may be a combination (linear liquid path or orthogonal liquid path) of the discharge ports, the liquid path and the electro-thermal transducer disclosed in the above U.S. patents, or a construction disclosed in U.S. Pat. Nos. 4,558,333 or 4,459,600 in which the thermal action means is arranged in a bent area.

The construction may be that disclosed in Japanese Laid-Open Patent Application No. 59-123670 in which a common slit is used as a discharge unit of an electro-thermal transducer, or Japanese Laid-Open Patent Application No. 59-138461 in which openings for absorbing a pressure wave of thermal energy are associated with a discharge unit.

A full line type record head having a length corresponding to a maximum width of a record sheet on which the recording apparatus can record may be a combination of a plurality of record heads disclosed in the above documents a single integral record head.

The present invention is also applicable to an exchangeable chip type record head which permits electrical connection with the main body or supply of ink from the main body by mounting it on the main body, or a cartridge type record head in which an ink tank is integrally formed with the record head.

The addition of recovery means or provisional auxiliary means to the record head is preferable as it further stabilizes the effects of the present invention. Specifically, capping means for the record head, cleaning means, pressuring or suction means, provisional heating means by an electro-thermal transducer or other heating element or a combination thereof and means for effecting a preliminary discharge mode for conducting discharge other than in recording is effective for stable recording.

The recording mode of the recording apparatus may be one which uses only a primary color such as black, or a multi-color type which uses different colors or a full color type which uses a mixture of colors by integration of recording heads or a combination of a plurality of recording heads.

While liquid ink is used in the embodiments of the present invention, ink which is solidified at or lower than a room temperature and softened or liquidified at the room temperature may be used, and in the ink jet recording apparatus, the ink may be temperature-controlled such that the viscosity of the ink is in a stable discharge range by the temperature control between 30° C. and 70° C. so long as the ink is liquid when the record signal is applied.

The temperature rise by the thermal energy may be prevented by utilizing it as an energy by state change of the ink from a solid state to a liquid state, or ink which is solidified when it is left may be used to prevent the evaporation of the ink. In any case, the ink which is liquidified by the thermal energy such as the ink which is liquidified by the thermal energy in accordance with the record signal and which is discharged as liquid ink or starts to be solidified when it reaches the record sheet, may be used. In this case, the ink may face the electro-thermal transducer while it is held in a porous sheet or through-holes as liquid or solid material as disclosed in Japanese Laid-Open Patent Application No. 54-56847 or Japanese Laid-Open Patent Application No. 60-71260. In the present invention, the film boiling method is most effective to the inks described above.

The recording apparatus of the present invention may be used as an integral or discrete image output terminal of an information processing system such as word processor or computer, a copying apparatus combined with a reader, or a facsimile system having a send/receive function.

In accordance with the present invention, mistransmission of print data from the host to the printer when the printer power supply is in the off-state is prevented.

What is claimed is:

1. A recording apparatus, usable with a host capable of transmitting data to said recording apparatus to form an image on a recording medium, said recording apparatus comprising:

record means for recording an image on the recording medium in accordance with data transmitted from the host;

switch means for switching a condition of said recording apparatus, said switch means switching the condition of said recording apparatus between a recording condition of enabling a recording operation and a non-recording condition of disenabling the recording operation;

power supply means for supplying a predetermined power to said recording apparatus regardless of a switching operation of said switch means; and control means, activated by the predetermined power supplied by said power supply means, for controlling said record means, said control means comprising changing means for changing the condition of said recording apparatus from the non-recording condition to the recording condition when at least one of data or a predetermined control signal is sent from the host to said recording apparatus in a case that said recording apparatus is in the non-recording condition.

2. A recording apparatus according to claim 1, wherein said changing means changes the condition of said recording apparatus from the recording condition to the non-recording condition when data is not sent by the host for at least a predetermined time period in a case that said recording apparatus is in the recording condition.

3. A recording apparatus according to claim 1 or 2, wherein said record means records an image by discharging ink droplets onto the recording medium by causing a state change in ink by using energy generated by an energy generation element.

4. A recording apparatus according to claim 3, wherein the energy is thermal energy.

5. A recording apparatus, usable with a host capable of transmitting data to said recording apparatus to form an image on a recording medium, said recording apparatus comprising:

record means for recording an image on the recording medium in accordance with data transmitted from the host;

storage means for storing data sent from the host;

switch means for switching a condition of said recording apparatus, said switch means switching the condition of said recording apparatus between a recording condition of enabling a recording operation and a non-recording condition of disenabling the recording operation;

power supply means for supplying a predetermined power to said recording apparatus regardless of a switching operation of said switch means;

first control means, activated by the predetermined power supplied by said power supply means, for controlling said record means; and second control means, activated by the predetermined power supplied by said power supply means, for controlling said storage means, wherein when data is transmitted from the host in the non-recording condition, said second control means controls said storage means to store the transmitted data therein and thereafter said first control means controls said record means to record the data stored in said storage means by changing the condition of said recording apparatus from the non-recording condition to the recording condition with said switch means.

6. A recording apparatus according to claim 5, further comprising display means for displaying that data is stored in said storage means.

7. A recording apparatus according to claim 5, wherein said record means records an image by discharging ink droplets onto the recording medium by causing a state change in ink by using energy generated by an energy generation element.

8. A recording apparatus according to claim 7, wherein the energy is thermal energy.

9. A recording apparatus, usable with a host capable of transmitting data to said recording apparatus to form an image on a recording medium, said recording apparatus comprising:

record means for recording an image on the recording medium in accordance with data transmitted from the host;

switch means for switching a state of said recording apparatus, said switch means switching the state of said recording apparatus between (1) a state where data is receivable from the host and (2) a state where data is not receivable from the host;

power supply means for supplying a predetermined power to said recording apparatus regardless of a switching operation of said switch means;

control means, activated by the predetermined power supplied by said power supply means, for controlling said record means, said control means comprising means for causing said record means to execute a predetermined initial process in response to the switching operation of said switch means when said power supply means supplies the predetermined power to said recording apparatus; and setting means, activated by the predetermined power supplied by said power supply means, for setting a state of a predetermined control signal in response to the switching operation of said switch means when said power supply means supplies the predetermined power to said recording apparatus, the predetermined control signal having a first state and a second state to inform the host whether or not said recording apparatus is in the state where data is receivable from the host, wherein said setting means sets the state of the predetermined control signal to the second state corresponding to a high impedance condition to inform the host that data is not receivable when said switch means switches the state of said recording apparatus into the state where data is not receivable from the host.

10. A recording apparatus according to claim 9, wherein said record means comprises a recording head having a plurality of record elements and scan means for conducting scan-recording by moving said recording head relative to the recording medium.

11. A recording apparatus according to claim 9, wherein said record means comprises a recording head having a plurality of recording elements, and wherein the predetermined initial process is for stabilizing a recording condition of said recording head.

12. A recording apparatus according to claim 9, further comprising interface means for sending the predetermined control signal to the host and power control means for controlling a supply of power to said interface means, said power control means stopping the supply of power to said interface means when the predetermined control signal is set to the high impedance condition.

13. A recording apparatus according to any one of claims 10 to 12, wherein said recording head records an image on the recording medium by discharging ink droplets onto the recording medium.

14. A recording apparatus according to claim 9, wherein said record means comprises a recording head for discharging ink droplets to record an image on the recording medium.

15. A recording apparatus according to claim 3, wherein said recording head discharges ink droplets by causing a state change in ink by using thermal energy.

16. A recording apparatus according to claim 14, wherein said recording head discharges ink droplets by causing a state change in ink by using thermal energy.

17. A recording apparatus, usable with a host capable of transmitting data to said recording apparatus to form an image on a recording medium, said recording apparatus comprising:

record means for recording an image on the recording medium in accordance with data transmitted from the host;
  switch means for switching a state of said recording apparatus, said switch means switching the state of said recording apparatus between (1) a state where data is receivable from the host and (2) a state where data is not receivable from the host;
  power supply means for supplying a predetermined power to said recording apparatus regardless of a switching operation of said switch means;
  control means, activated by the predetermined power supplied by said power supply means, for controlling said record means, said control means comprising means for causing said record means to execute a predetermined initial process in response to the switching operation of said switch means when said power supply means supplies the predetermined power to said recording apparatus; and
  setting means, activated by the predetermined power supplied by said power supply means, for setting a state of a predetermined control signal in response to the switching operation of said switch means when said power supply means supplies the predetermined power to said recording apparatus, the predetermined control signal having a first state and a second state to inform the host whether or not said recording apparatus is in the state where data is receivable from the host,
  wherein said setting means sets the state of the predetermined control signal to the second state to inform the host that data is not receivable when said switch means switches the state of said recording apparatus into the state where data is not receivable from the host.

18. A recording apparatus according to claim 17, wherein the first state of the predetermined control signal indicates that the predetermined control signal is active, and the second state of the predetermined control signal indicates that the predetermined control signal is inactive.

19. A recording apparatus according to claim 18, wherein the second state indicates that the state of the predetermined control signal is an active state.

20. A recording apparatus according to claim 18, wherein the second state indicates that the state of the predetermined control signal is a state corresponding to a high impedance condition.

21. A recording apparatus according to claim 20, wherein said control means comprises interface means for sending the predetermined control signal to the host, and power control means for controlling a supply of power to said interface means, wherein said power control means stops the supply of power to said interface means when the state of the predetermined control signal is set to the state corresponding to the high impedance condition.

22. A recording apparatus according to any one of claims 18 to 21, wherein said record means comprises a recording head having a plurality of record elements and scan means for conducting scan-recording by moving said recording head relative to the recording medium.

23. A recording apparatus according to claim 22, further comprising convey means for conveying the recording medium by a predetermined amount after the scan-recording by said scan means.

24. A recording apparatus according to claim 23, wherein said recording head records an image on the recording medium by discharging ink droplets onto the recording medium.

25. A recording apparatus according to claim 24, wherein said recording head discharges ink droplets by causing a state change in ink by using thermal energy.

26. A recording apparatus according to claim 17, wherein said record means comprises a recording head having a plurality of recording elements, and wherein the predetermined initial process is for stabilizing a recording condition of said recording head.

27. A recording apparatus according to claim 26, wherein said recording head records an image by discharging ink droplets, and wherein the predetermined initial process is for stabilizing an ink discharge condition of said recording head.

28. A recording apparatus according to claim 27, wherein said recording head discharges ink droplets by causing a state change in ink by using thermal energy.

* * * * *

UNITED STATES PATENT AND TRADEMARK OFFICE
CERTIFICATE OF CORRECTION

PATENT NO. : 5,652,607
DATED : July 29, 1997
INVENTOR(S) : Tomoaki MASAKI

It is certified that error appears in the above-indentified patent and that said Letters Patent is hereby corrected as shown below:

ON THE COVER PAGE

AT [56] References Cited - FOREIGN PATENT DOCUMENTS:
"59-1236670" should read --59-123670--.

AT [57] ABSTRACT:
Line 5, "to" (first occurrence) should be deleted.

IN THE DRAWINGS

Sheet 7 of 12:
Figure 7, Step S204, "IMPEADANCE" should read --IMPEDANCE--;

Sheet 11 of 12:
Figure 11, Step S404, "FXECHTE" should read --EXECUTE--;

UNITED STATES PATENT AND TRADEMARK OFFICE
CERTIFICATE OF CORRECTION

PATENT NO. : 5,652,607          Page 2 of 3
DATED      : July 29, 1997
INVENTOR(S): Tomoaki MASAKI It is certified that error appears in the above-indentified patent and that said Letters Patent is hereby corrected as shown below:

Sheet 12 of 12:

Figure 12, Step S602, "MOST" should read --HOST--;

Figure 13, Step S504, "FXECHTE" should read --EXECUTE--.

IN THE DISCLOSURE

COLUMN 3:

Line 21, "polysulfon," should read --polysulfone,--; and "polyphnylen" should read --polyphenylene--.

COLUMN 4:

Line 6, "dusts" should read --dust--;
Line 27, "control," should read --control--.

COLUMN 7:

Line 22, "printer." should read --printer--.

UNITED STATES PATENT AND TRADEMARK OFFICE
CERTIFICATE OF CORRECTION

PATENT NO.   : 5,652,607
DATED        : July 29, 1997
INVENTOR(S)  : Tomoaki MASAKI It is certified that error appears in the above-indentified patent and that said Letters Patent is hereby corrected as shown below:

COLUMN 8:

Line 46, "by" should read --for--.

COLUMN 11:

Line 11, "claim 3," should read --claim 13,--.

COLUMN 12:

Line 11, "claim 18," should read --claim 17,--;
    Line 24, "18 to 21," should read --17 to 21,--.

Signed and Sealed this

Fourteenth Day of April, 1998

Attest:

BRUCE LEHMAN

*Attesting Officer*        *Commissioner of Patents and Trademarks*